G. CHALENDER.
Center-Bearing for Locomotive Trucks.

No. 210,749. Patented Dec. 10, 1878.

Attest:
F. B. Brock
D. G. Stuart

Inventor:
George Chalender
by A. McCallum
Attorney.

UNITED STATES PATENT OFFICE.

GEORGE CHALENDER, OF AURORA, ILLINOIS.

IMPROVEMENT IN CENTER-BEARINGS FOR LOCOMOTIVE-TRUCKS.

Specification forming part of Letters Patent No. 210,749, dated December 10, 1878; application filed November 22, 1878.

*To all whom it may concern:*

Be it known that I, GEORGE CHALENDER, of Aurora, in the county of Kane and State of Illinois, have invented certain new and useful Improvements in Center-Bearings in Locomotive-Trucks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is particularly designed for use in connection with the pilot-wheel trucks of locomotive-engines, but may also be applied to the trucks of passenger and freight cars, the object being to provide a central bearing which will permit the lateral play and all the necessary movements of the trucks without being subject to the sudden jerks and violent concussions between the rails and flanges of the wheels consequent on the use of the swinging beams heretofore in general use, the improved device also possessing the further advantages of simplicity of construction, perfection of operation, and a great saving in the original cost of construction and subsequent cost of repairs.

Figure 1:
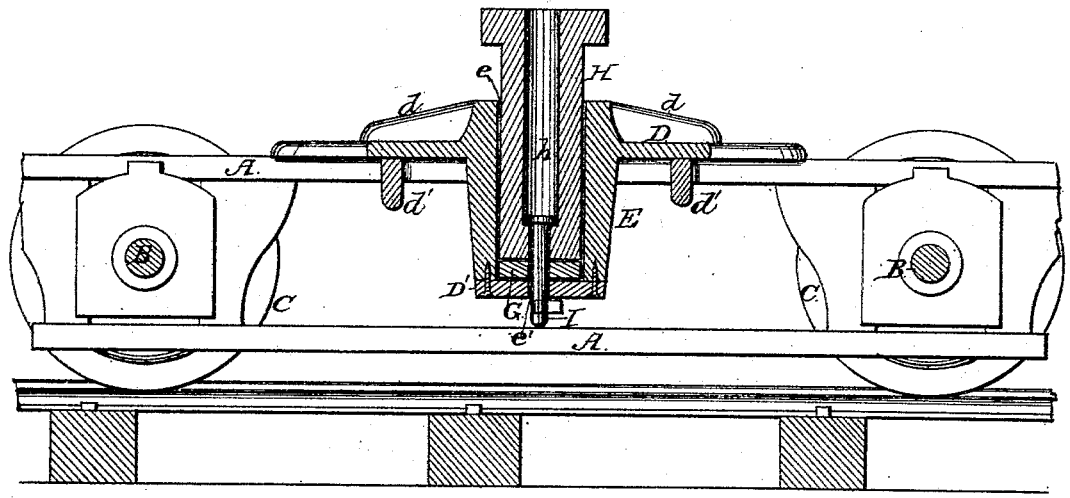
Figure 2:
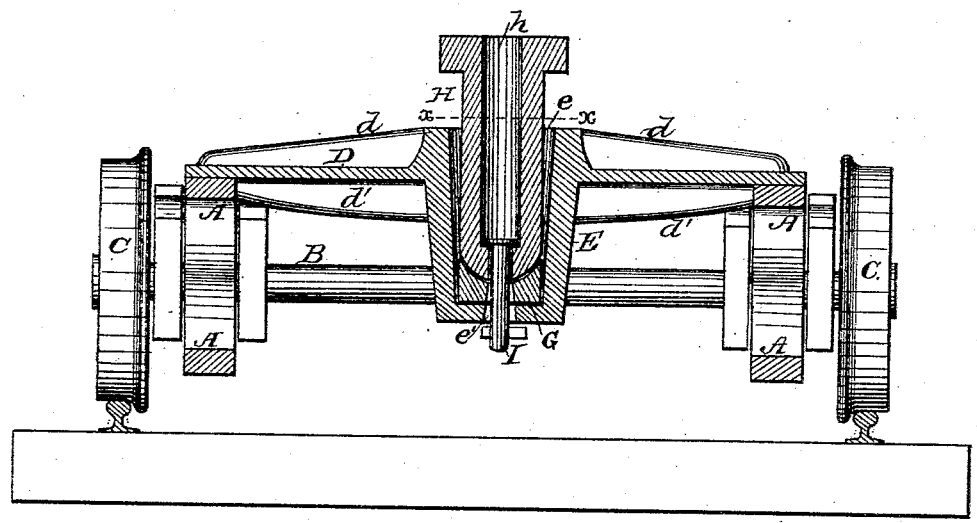

In the accompanying drawings, Figure 1 is a longitudinal sectional view of a pilot-wheel truck. Fig. 2 is a cross-section of same, and Fig. 3 is a sectional view taken on the line $x\,x$, Fig. 2.

Referring to the parts by letters, A represents the framing, B B the axles, and C C the wheels, of a four-wheel pilot-truck, which may be constructed in the usual manner. D represents the platform or cross-beam which connects the side framing A and forms the bearing for the forward end of the locomotive. I prefer to have it made in the form of a plate of metal, strengthened by upper webs, $d$, radiating from the central portion, as shown by Fig. 3 of the drawings, and with cross or truss webs $d'$ formed on its under side. This bearing beam or plate D is rigidly secured to the side framing of the truck by bolts, or otherwise, in any suitable manner.

Figure 3:
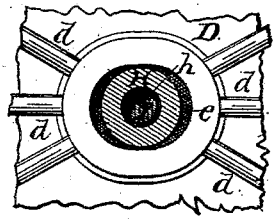

The central portion of the plate D is formed with a socket, E, having an opening or recess, $e$, of tapering or conical form, and ovoidal or elliptical in its cross-section, as clearly shown by Fig. 3 of the drawings.

The lower end of the socket is formed with a bolt or pin hole, $e'$, also of conical form, and ovoidal in its cross-section, said hole, however, flaring downwardly, or in the opposite direction from the recess $e$, as clearly shown by Fig. 2 of the drawings. The lower end of the socket E, through which the hole $e'$ is formed, may be cast solid with the other parts of the plate D, or it may be made of a separate and removable plate, D', secured to the socket in any suitable or convenient manner.

Resting in the bottom or lower end of the recess $e$ is a bearing-block, G, of less diameter than the smallest diameter of the recess, so as to fit loosely and have a certain amount of lateral play within the socket. The lower face of this bearing G is flat or a plain surface, while its upper face is arc-shaped or concave in its cross-section, and a conical hole is formed centrally through it corresponding in form and with the taper of the hole $e'$, as clearly shown by Fig. 2 of the drawings.

H is a cylindrical socket and bearing, to the upper portion of which the body of the locomotive is secured in any suitable manner. The lower end of this socket-bearing H is made convex in its cross-section to correspond with the concavity in the upper surface of the block G.

I is the center-pin or king-bolt, the head of which rests in the bottom of the recess $h$ in the bearing H, while its shaft is passed through a circular opening in the bottom of the bearing H and through the conical openings in the block G and lower end of the socket E.

If desired, the concavity in the bearing-block G may be cup-shaped, and the lower end of the part H be of corresponding convex form; but I prefer to have these bearing-surfaces concavo-convex in their cross-section only, as shown by the drawings, for reasons hereinafter stated.

With a central bearing of this construction, it will be seen that the truck is free to turn on a horizontal plane beneath the locomotive, and also that a laterally-rocking motion to a limited extent is permitted, while movement in a longitudinal direction is prevented, except so far as to allow for the unavoidable vibration of the locomotive, the slight difference in the diameters of the bearings and the socket in the direction of the line of progression allowing for all necessary vibration without injury to the parts.

By the use of my improved bearings the movement of the truck in a lateral direction is accomplished without any sudden jerk and consequent forcible concussion between the flanges of the wheels and the rails, as is the case when swinging beams are employed, and therefore the cutting of the flanges is in a great measure obviated by the use of my device.

I have herein shown and described the application of my device to the pilot-truck of a locomotive-engine; but, as will be evident to those skilled in the art, it may also be applied to the trucks of cars.

I am aware that center-pin bearings having a rocking motion have before been known and used, and that Letters Patent were granted to B. W. Healey June 8, 1869, for certain improvements thereon.

I do not, therefore, broadly claim to be the first inventor of such rocking bearings; but

What I claim as my invention, and desire to secure by Letters Patent, is—

1. The socket E, having tapering or conical recess $e$ and hole $e'$, ovoidal in form, as described, operating, in combination with the bearings G H and center-pin I, substantially as and for the purpose specified.

2. The cylindrical socket-bearing H, constructed as described, with its lower bearing-surface made convex, and the block G, having its upper surface made correspondingly concave in lateral or cross section, operating, in combination with the socket E, so as to permit of a rocking motion in a lateral direction only, substantially as set forth.

3. The plate D, having the upper radial webs, $d$, and lower truss-webs, $d'$, in combination with the side framing A, substantially as and for the purpose specified.

In testimony that I claim the foregoing as my own I hereto affix my signature in presence of two witnesses.

GEORGE CHALENDER.

Witnesses:
P. R. MARLING,
JOHN CARLSON.